United States Patent
Rizkin et al.

(10) Patent No.: US 6,201,915 B1
(45) Date of Patent: Mar. 13, 2001

(54) HIGH EFFICIENCY LIGHTING SYSTEM HAVING A REMOTE LIGHT SOURCE

(75) Inventors: Alexander Rizkin, Redondo Beach; Yevgeniy Durets, Long Beach; Vladimir Rubtsov, Los Angeles; David Ruiz, Redondo Beach; Robert H. Tudhope, Rancho Palos Verdes, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/170,811

(22) Filed: Oct. 13, 1998

(51) Int. Cl.[7] .............................. G02B 6/04; F21V 8/00
(52) U.S. Cl. ......................... 385/115; 362/554; 362/583
(58) Field of Search ................................ 385/115, 901, 385/54, 116; 362/84, 218, 551, 554, 556, 583, 217

(56) References Cited

U.S. PATENT DOCUMENTS

| | | | |
|---|---|---|---|
| 3,301,648 | 1/1967 | Sheldon | 65/4 |
| 3,457,454 | 7/1969 | Boland | 315/115 |
| 3,733,481 | 5/1973 | Kuyt | 240/47 |
| 3,775,606 | 11/1973 | Bazell et al. | 240/47 |
| 3,861,781 | 1/1975 | Hasegawa et al. | 350/96 C |
| 3,984,174 * | 10/1976 | Landgreen | 385/54 |
| 3,986,018 * | 10/1976 | Ishii | 240/47 |
| 4,234,910 | 11/1980 | Price | 362/105 |
| 4,264,127 | 4/1981 | Schumacher et al. | 362/96.2 |
| 4,264,129 | 4/1981 | Warkentine | 350/96.22 |
| 4,303,304 | 12/1981 | Ruiz | 350/96.2 |
| 4,704,660 | 11/1987 | Robbins | 362/32 |
| 4,825,341 | 4/1989 | Awai | 362/32 |
| 4,922,385 | 5/1990 | Awai | 362/32 |
| 4,975,810 | 12/1990 | Vanderbel | 362/32 |
| 5,042,900 | 8/1991 | Parker | 385/76 |
| 5,072,338 | 12/1991 | Hug et al. | 362/32 |
| 5,099,399 | 3/1992 | Miller et al. | 362/32 |
| 5,111,367 | 5/1992 | Churchill | 362/32 |
| 5,187,765 * | 2/1993 | Muehlemann et al. | 385/115 |
| 5,193,133 | 3/1993 | Schofield et al. | 385/85 |
| 5,216,846 | 6/1993 | Takahashi | 51/326 |
| 5,269,998 | 12/1993 | Takagi et al. | 264/328.1 |
| 5,295,052 | 3/1994 | Chin et al. | 362/32 |
| 5,409,480 | 4/1995 | Uram | 606/10 |
| 5,479,322 | 12/1995 | Kacheria | 362/32 |
| 5,530,632 | 6/1996 | Shikano et al. | 362/109 |
| 5,653,519 | 8/1997 | Dobbs | 362/32 |
| 5,779,353 * | 7/1998 | Kacheria | 362/293 |

FOREIGN PATENT DOCUMENTS

| | | | |
|---|---|---|---|
| 15088/92 * | 6/1992 | (AU) | 385/54 |
| 62-100703 * | 5/1987 | (JP) | 385/115 |

* cited by examiner

Primary Examiner—John D. Lee
(74) Attorney, Agent, or Firm—Nilles & Nilles, S.C.

(57) ABSTRACT

A remote light source lighting system is provided having an illuminator assembly including a housing. Held within the housing is a high intensity light source for providing light energy to a fiber optic cable bundle connected to the housing and facing the light source. The cable bundle includes a plurality of plastic optical fibers wherein at least one of the terminal ends of the bundle is formed by molding an optical quality resin around an optically transparent ferrule that binds the exposed ends of the optical fibers. The housing further includes a separate air plenum containing a blower. The blower produces a high velocity air stream directed precisely at the terminal end of the cable adjacent the light source to cool the terminal end.

17 Claims, 6 Drawing Sheets

HIGH EFFICIENCY LIGHTING SYSTEM HAVING A REMOTE LIGHT SOURCE

BACKGROUND OF THE INVENTION

1. Field of the Invention

The present invention relates generally to lighting systems utilizing a high intensity light source, and more particularly to a more durable and higher efficiency lighting system including a high intensity light source and a plastic fiber optic cable bundle for transmitting the light to a remote area.

2. Description of the Related Art

Lighting systems are known in the art that utilize a high intensity light source which generates an enormous amount of radiant energy. The light energy is transmitted through optical fibers of the bundle to the other terminal end of the bundle and dissipated to the desired locations or areas to be illuminated. The terminal end adjacent the light source or the source end of the cable bundle is exposed to a large amount of radiant energy that is in converted to heat if absorbed by the components. The amount of heat absorbed in a typical remote lighting system can increase the temperature of the source end or bundle tip to well over a 100° C.

The typical glass fiber bundle construction at least at the source end includes a plurality of optical fibers bound together. Each of the fibers has a round or circular cross section so when they are bound or packed together, they define spaces between the individual fibers. The spaces are filled with an adhesive resin material in order to securely hold or bond the fiber ends to one another. A metal ferrule or ring holds the fibers in place as well, thus forming a terminal end of the cable. The adhesive resin material is not optically transparent and thus light energy hitting the resin and not the optical fiber tips is absorbed by the resin material and not transmitted through the fibers. This reduces the transmission efficiency of the bundle. Additionally, the absorbed heat can damage or destroy the terminal ends of the bundle. The metal ferrule also absorbs and retains heat to further exacerbate the problem.

Heat absorbed by the terminal end destroys or melts the resin at the tip of the fiber optic bundle. As the resin material softens, the resin can loosen from within the spaces between the fibers. The loosened resin results in separation of the fiber ends from one another which affects the light transmission efficiency and quality of the bundle. The loosened resin also blocks some of the light from entering the fiber optic cables. Therefore, more light energy is absorbed at the tip of the fiber optic bundle, further decreasing the efficiency of the lighting system.

Such remote high intensity lighting systems utilize glass optical fibers that inherently have relatively high melting temperatures. However, plastic fibers are more desirable because of higher flexibility, lower weight and a much lower cost. A problem with plastic fibers is that they have a relatively low melting temperature, around 70° C. in high transparency fibers. Thus only low concentrations of light energy can be used along with plastic cables to avoid melting or destroying the fibers, eliminating many of the benefits of the plastic fibers.

Attempts have been made to reduce temperatures of the fiber end adjacent the light source by designing special cooling systems to dissipate heat generated by the high intensity light source. These methods and systems for cooling fiber optic cable bundles are relatively expensive to use and have not been found to be successful in reducing temperatures below the melting point of plastic optical fibers.

One such system or method is disclosed in the U.S. Pat. No. 5,479,322 issued to Kacheria. Air is moved through an enclosure by a fan and is directed via a baffle system toward the end of the fiber optic bundle. The air is moved essentially parallel relative to the fiber optic bundle and therefore does not directly contact the tip of the fiber optic bundle. The cooling is thus provided by air passing into the primary chamber of the enclosure which houses the high intensity light source and then out of the enclosure in order to carry away some of the heat. However, this system does not effectively dissipate heat absorbed by the optical fibers at the terminal end or bundle tip, because the plenum is created inside of the housing that includes the heat sources and because air flow does not run across the bundle directly.

Another such system is disclosed in U.S. Pat. No. 4,825,341 issued to Awai. The system disclosed by Awai also utilizes air moving through an enclosure in order to dissipate the heat generated by the high intensity light source. This particular system utilizes a downstream fan to draw air through the enclosure from behind the light source. Air is drawn from an intake through a plurality of entrance ducts or passages into the enclosure containing both the light source and the fiber optic bundle tip. The fiber optic bundle tip includes a bezel block extending into the chamber containing the high intensity light source. This type of system utilizes a high volume of air in order to dissipate the heat generated by the light source within the chamber. However, heat absorbed by the fiber optic bundle and the bezel block that surrounds the bundle tip is not efficiently dissipated. Additionally, the bezel block may actually assist to retain heat around the bundle tip.

Another method is disclosed in U.S. Pat. No. 5,653,519, issued to Dobbs. The system disclosed in Dobbs also does not efficiently cool the tip of the fiber optic bundle. Again, air is merely passed through the chamber in order to remove heated air within the chamber to dissipate the heat collected therein. Any heat absorbed by the fiber optic bundle is essentially retained within the bundle tip and therefore the problems discussed above are again not solved by the disclosure of Dobbs.

An additional system is disclosed in U.S. Pat. No. 5,099,399, issued to Miller et al. which discloses surrounding part of the terminal end of the fiber optic cable with a heat sink or bushing. The heat sink has an air opening or passage adjacent and parallel to the fiber optic bundle in order to pass air through the heat sink into the housing which encloses the high intensity light source. Air is drawn through the passages of the heat sink by a fan located downstream of the light source within the housing. A glass rod is placed concentrically abutting the end of the plastic fiber optic bundle and protrudes into the housing and is closely adjacent the high intensity light source.

The system disclosed by Miller et al. again dissipates heat from within the housing by moving air therethrough. The system also will dissipate some heat from the end of the plastic fiber optic bundle. However, because one end of the glass rod touches the tip of the fiber optic bundle and the exposed end of the glass rod faces the high intensity light source, light energy conducted through the glass rod has high light density so that the amount of heat absorbed by bundle components cannot be reduced sufficiently. The heat sink and also the air passages do not provide direct cooling of the fiber optic bundle tip, but instead only of the glass rod. Additionally, the light energy is transmitted through the glass rod to the plastic bundle and thus generates heat based upon the amount of radiant energy absorbed in the rod. The heat generated within the glass rod is transmitted directly to the bundle tip at the contact point between the plastic and the glass. The plastic bundle has a very low thermal conductivity and without special cooling of the tip of the bundle itself, heat at its very tip is generated and is not adequately cooled by the disclosure of Miller et al.

At the remote or distal end of the fiber optic bundle of remote lighting systems, light emanating through the fiber optic cables is transmitted to the desired locations or areas. Glass optical fibers having diameters in a range of about 30 to about 100 microns have been known and used for several decades. The optical fibers are assembled together parallel to one another with the ends of each fiber terminating in a surface finished end having a mirror quality finish at each end of the bundle.

For glass optical fibers, the typical method utilized for preparing and surfacing the fiber optic bundle ends includes the following steps. Each end portion of the bundled grouping of raw fibers is dipped in a liquid, preferably alcohol to create Vander-Wals forces that bond and compress the fibers together and to align the fibers in a parallel fashion by means of combing. The fibers are combed to align them in a parallel manner and then further compressed by means of a wraparound cord wound around each end of the bundle. The ends of the bundle are pulled through a cylindrical metal ferrule to tightly pack the fibers together. The fibers are then dried to evaporate the liquid or alcohol. A bonding agent epoxy resin is then applied to the ends to fill the spaces between the individual optical fibers of the cable and to securely hold the fibers in place.

After curing of the resin is complete, the excessive fibers and resin epoxy extending beyond the end of the metal ferrule is cut off or removed. Both ends or tips of the fiber optic cable bundle are then surface polished in order to form a mirror quality surface of each terminal end of the cable.

One critical element in the construction of fiber optic cables is defined as the packing factor or ratio of the cross-section of the actual fiber material to the cross-section of the internal area of the terminating metal ferrule and epoxy resin. The packing factor determines at least partially the loss of light due to absorption of light energy in the space between the fibers containing the adhesive or resin material. The typical packing factor for conventional glass optical fiber bundles is about 65–70 percent wherein the glass optical fibers are on the order of 50 microns in diameter. This means that about 30–35 percent of the terminal end transverse face is ferrule or epoxy resin material. The metal ferrule material and resin are not light transparent and therefore absorb any light energy incident thereon, thus further reducing the efficiency of the bundle.

An additional problem is that for fiber optic remote lighting systems, the light source is an extremely high intensity lamp producing an enormous amount of radiant energy, especially for sources such as xenon and metal-halide lamps combined with an elliptical reflector. The luminous flux produced by the light sources is transmitted by the fibers and absorbed by the metal ferrule and the resin material between the fibers. The heat absorbed by the terminal end greatly increases the temperature of the tips of the fiber optic bundle.

The temperature at the input or source end of the cable can reach well over 100° C. and destroy the resin at the tip of the bundle by burning it or softening it so that it comes out of the space between the fibers. The loosened resin material can block the light path through the fibers. As described above, attempts have been made to utilize volume air movement to generally dissipate heat within a chamber or enclosure of the apparatus.

Plastic light guides utilizing plastic fiber optic elements are desirable because of the low cost, low weight, high flexibility and larger cable diameters. However, one disadvantage is that the plastic optical fibers have melting temperatures as low as 70° C. These low melting temperatures result in destruction of the optical fibers and terminal ends when exposed to the high intensity light sources in remote lighting systems. The high heat absorption can also destroy the cables downstream of the terminal ends. The glass fiber cable construction at the terminal ends is inadequate for use with plastic optical fibers in high concentration light energy systems.

An ideal highly efficient lighting system would include a high intensity light source coupled to a large diameter plastic fiber optic cable bundle. However, as described above it is heretofore not possible to utilize a high intensity light source coupled to the plastic optical fibers. This is because there is currently no means by which the terminal end of the bundle can be manufactured so as not to absorb large amounts of light energy as heat. This is further because all of the known cooling methods are not efficient enough in order to continually maintain a temperature at the terminal end of the cable below the melting point of plastic optical fibers which is about 70° C.

SUMMARY OF THE INVENTION

The present invention is therefore directed to creating a highly efficient illumination system which consists of a high efficiency and high intensity illuminator which can incorporate filter optics or other optical elements and which is coupled to plastic fiber optic cables for remote illumination. A described above, high efficiency and high intensity illuminators are available as are plastic fiber optic cables. However, combining the two has heretofore not been feasible because of the severe disadvantages of exposing the terminal ends of plastic optical fibers to the light flux in the focal plane of a high intensity illuminator.

A high efficiency and high intensity illuminator previously could only be used with glass optical fibers because the fibers have sufficient melting temperature on the order of about 450°–500° C. Another option previously would have been to use plastic optical fibers along with a fairly inefficient or low energy light source which produces fairly low intensity energy, for example halogen bulbs, where existing cooling systems adequately cooled the fiber optic bundle tips.

However, existing technology for cooling the fiber bundle tips in high energy light systems is not adequate for use of plastic fibers. A high velocity air moving system is an alternative. The present invention is therefore more specifically directed to a remote lighting system or apparatus utilizing a plastic optical fiber cable bundle with distributed absorption of heat along the terminal end in combination with a high velocity air moving cooling system. The present invention is also directed to a construction and method of forming such durable terminal ends of a plastic fiber optic cable bundle for use both at the source end and at the distal output end of the cable in a remote lighting system.

One object of the present invention is to provide a more efficient remote lighting system or apparatus utilizing a high intensity light source and plastic optical fibers. A further object of the present invention is to provide a method of forming a terminal end of a plastic optical fiber cable bundle that distributes the absorbed heat along a volume of the bundle tip, and thus can be exposed to a high concentration of light energy, such as a focal plane of a high intensity light source. Another object of the present invention is to provide a method of forming such a novel construction of a plastic cable bundle. A further object of the present invention is to provide a high velocity air stream directly over the input end of the fiber optic cable of such a system without reducing the performance of the illuminator.

To achieve these and others objects of the invention, a lighting system is disclosed having a housing enclosure defining therein a primary chamber and a secondary plenum separate from the primary chamber. A high intensity light source is held within the primary chamber and has a light emitting end. A fiber optic cable bundle is connected to the housing and has a plurality of plastic optical fibers held within a sleeve. The bundle also has a source end disposed facing the light emitting end of the light source and a remote end for placement in an area to be illuminated. An air moving device is held within the secondary plenum and creates a stream of air moving within the secondary plenum at a first velocity. An air passage communicates with the plenum for concentrating and directing the stream of air across the source end of the cable bundle at an increased velocity relative to the first velocity.

The air moving mechanism may be a linear fan, a centrifugal blower or some other mechanism mounted within the secondary plenum. The air passage may be a nozzle or other specifically designed orifice in order to provide the increased velocity of the air stream as well as to direct the flow of air. By keeping the secondary plenum separate from the primary chamber, the cooling air is directed over the cable bundle end prior to mixing with the heated air within the chamber.

In one embodiment of the invention, a fiber optic cable bundle is disclosed and terminates at a pair of terminal ends. The cable bundle has a plurality of elongate plastic optical fibers bound together within a sleeve. Each optical fiber has a fiber tip at each respective terminal end. An exposed end of each of the plurality of optical fibers extends beyond the sleeve adjacent at least one of the terminal ends. A cylindrical ferrule made from an optically transparent material surrounds a portion of the exposed ends of the optical fibers. An optical quality resin material is molded and cured to encapsulate the ferrule and a substantial portion of the exposed ends of the optical fibers. The resin material is flush with the fiber tips of the optical fibers at the at least one terminal end. The end face of the fiber bundle is polished to a desired surface finish.

The fiber optic cable bundle construction of the invention eliminates both the heat absorbing metal ferrule and the heat absorbing epoxy resin previously used for fiber optic cable terminal ends. These elements are replaced by a non-heat absorbing optically transparent resin both for the ferrule securing the fibers together as well as to fill the gaps between the fibers. Thus, just by utilizing these components of the invention, the heat absorbing characteristics of the terminal end are reduced dramatically over prior known constructions.

In one embodiment of the invention, a method of forming a terminal end of an optical fiber cable bundle is disclosed including at least the following steps. The first step is to provide a fiber optic cable bundle including a sleeve surrounding a plurality of plastic optical fibers. Each optical fiber has a fiber tip at each respective terminal end. The next step is to remove a portion of the sleeve to expose at least one end of each of the optical fibers beyond a corresponding end of the sleeve. The next step is to slide a first ferrule having a first diameter over the exposed ends of the optical fibers. The first ferrule is made from an optically transparent material.

The next step is to slide a second ferrule having a second diameter slightly smaller than the first diameter into abutting relation with the first ferrule and over the exposed ends of the optical fibers. The next step is to move the first ferrule further onto the exposed ends of the optical fibers, leaving the second ferrule adjacent the fiber tips and creating a gap between the first and second ferrules on the at least on terminal end.

The next step is to mold an optical quality resin material around the terminal end so as to fill the gap and surround the exposed ends of the optical fibers as well as the first and second ferrules. The next step is to cure the resin material in order to harden the resin. The next step is to separate the second ferrule from the cable bundle including the resin material surrounding the second ferrule to expose a transverse surface at the terminal end. The final step is to polish the transverse surface including the fiber tips and the resin material to a desired finish.

The method may include additional steps in order to further improve the method and construction of the terminal end of the cable. For example, the exposed ends of the optical fibers may first be cleaned via forced air prior to adding the first and second ferrules. Additionally, a cord may be utilized to initially wrap the exposed fiber ends to increase the packing factor of the fibers.

By utilizing the method of the invention, the packing factor is increased over prior known constructions by 10 or 15 percent or more, thus reducing the amount of surface area of the terminal end that is not optical fiber material. The increased packing factor is achieved by utilizing the novel dual ferrule technology. Additionally, the method achieves a terminal end wherein all of the material is either optical fiber material or optically transparent resin material thus having dramatically reduced heat absorbing characteristics.

The remote illumination system of the invention produces a vast improvement over prior known constructions. The system of the invention permits utilization of plastic optical fibers in conjunction with a high intensity light source which was not previously feasible. The present invention permits this construction by utilizing optically transparent resin material at the terminal end of the cable to both fill the spaces between the fibers and for the ferrule which holds the fibers together and is cast around the optical fibers by the optically transparent resin. Additionally, by utilizing the method of the invention the packing factor of the terminal end is increased which increases the transmission efficiency of the bundle. The high velocity air stream and separate plenum construction described above further increases the efficiency of the system by permitting greater cooling of the terminal end of the cable.

Light energy which is incident on the terminal end of the cable bundle is absorbed somewhat in the optical fibers and the resin surrounding the fibers. Though the present invention utilizes optically transparent resin, some light generated heat is inevitably absorbed in the terminal end. By utilizing the casting method of the invention, the absorbed heat is transferred via thermal conductivity over a larger volume of the terminal end. The air stream of the invention can be tailored to a width which matches the length of the resin molded onto the terminal end of the cable bundle. The cooling performance can thus be improved dramatically by directing air over the entire area in which heat may be absorbed in the terminal end of the cable.

These and other objects, features and advantages of the present invention will become apparent when considered in conjunction with the following description and accompanying drawings. It should be understood, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided within the present invention, will become more readily apparent by referring to the exemplary, and therefore non-limiting, embodiments illustrated in the drawings accompanying and forming a part of this specification, wherein like reference numerals designate like elements, and in which.

DETAILED DESCRIPTION OF THE PRESENTLY PREFERRED EMBODIMENTS

Figure 1:
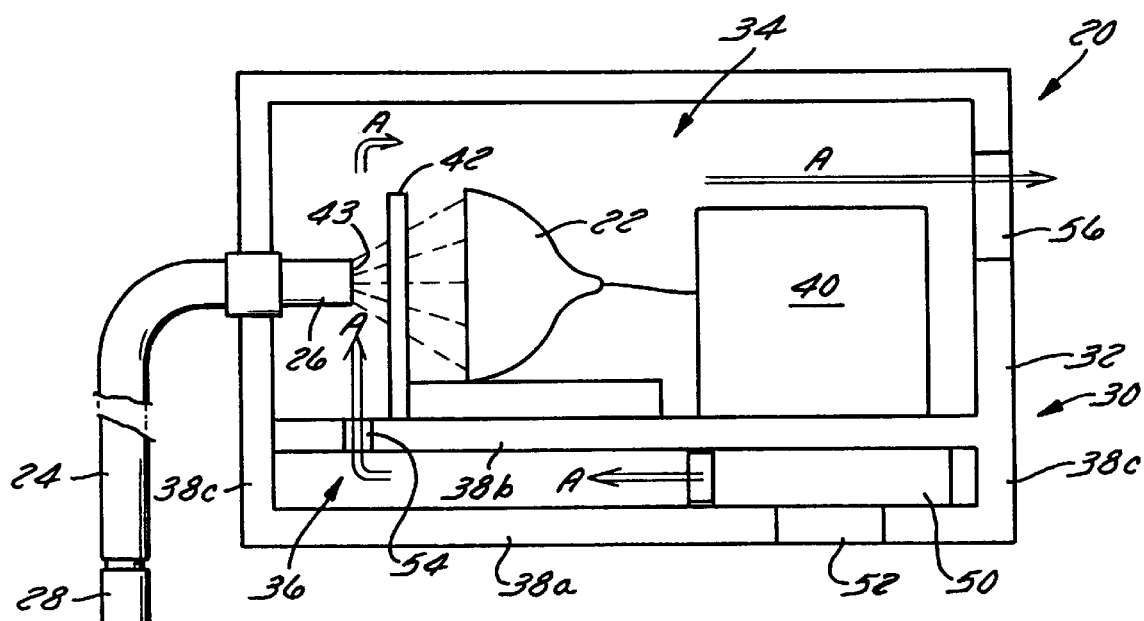
FIG. 1 illustrates a remote lighting system including a light source assembly having a cooling fan and an optical fiber cable, each constructed in accordance with embodiments of the present invention.

Referring now to the drawings, FIG. 1 illustrates a schematic view of a remote lighting system 20 having a light source or illuminator 22 and a fiber optic cable bundle 24 to carry the light energy to a remote location. The lighting system 20 incorporates several novel aspects of the present invention including a novel means of cooling the source end or terminal end 26 of the cable bundle disposed adjacent the light source 22. The source end 26 and a remote terminal end 28 of the fiber optic cable bundle 24 each have a novel construction fabricated according to a novel method of the invention. The novel cooling means and the novel terminal end construction of the cable permit use of plastic optical fibers in the bundle and yet substantially increase the light transmission efficiency and durability of the remote lighting system.

Referring again to FIG. 1, the schematic illustration of the system 20 also includes a light source assembly 30 with a unitary enclosure or housing 32 defining therein a primary chamber 34 and a separate secondary chamber or air plenum 36. The plenum 36 is bounded by a plenum enclosure including exterior walls 38a, an interior wall 38b separating the plenum from the primary chamber 34, and end walls 38c.

A power supply 40 is disposed within the primary chamber 34 and provides electric power to the light source 22 for illuminating the lamp. The light source 22 in the present embodiment is preferably a high intensity lamp such as a metal halide, a xenon, sulfur or other such lamp that produces a large amount of radiant energy. An optical element 42 in the form of a filter, lens or other such element may be disposed in front of the illuminator 22 for shaping, concentrating, filtering and directing the light in a predetermined manner. The terminal end or source end 26 of the cable bundle is disposed facing the high intensity lamp 22 and optical element 42 so that the light energy projecting from the lamp is incident upon a transverse face or surface 43 of the source end 26 of the cable.

A centrifugal blower or fan 50 is disposed within the secondary chamber or plenum 36 and draws air in through an air intake 52 formed in one of the exterior plenum walls 38a or end wall 38c. Air flow is illustrated by the arrows "A" in the Figures. Air is forced by the blower 50 through the plenum 36 in the direction of the arrows "A". An air duct or passage 54 is formed adjacent the source end 26 of the cable in the interior plenum wall 38b. The construction of the duct 54 and its performance characteristics are described in greater detail below with reference to FIGS. 10–14. The air continues to flow through the primary chamber 34 in the direction of arrows "A" and exits the primary chamber and the housing 32 through an air outlet opening or exhaust 56.

Figure 2A:
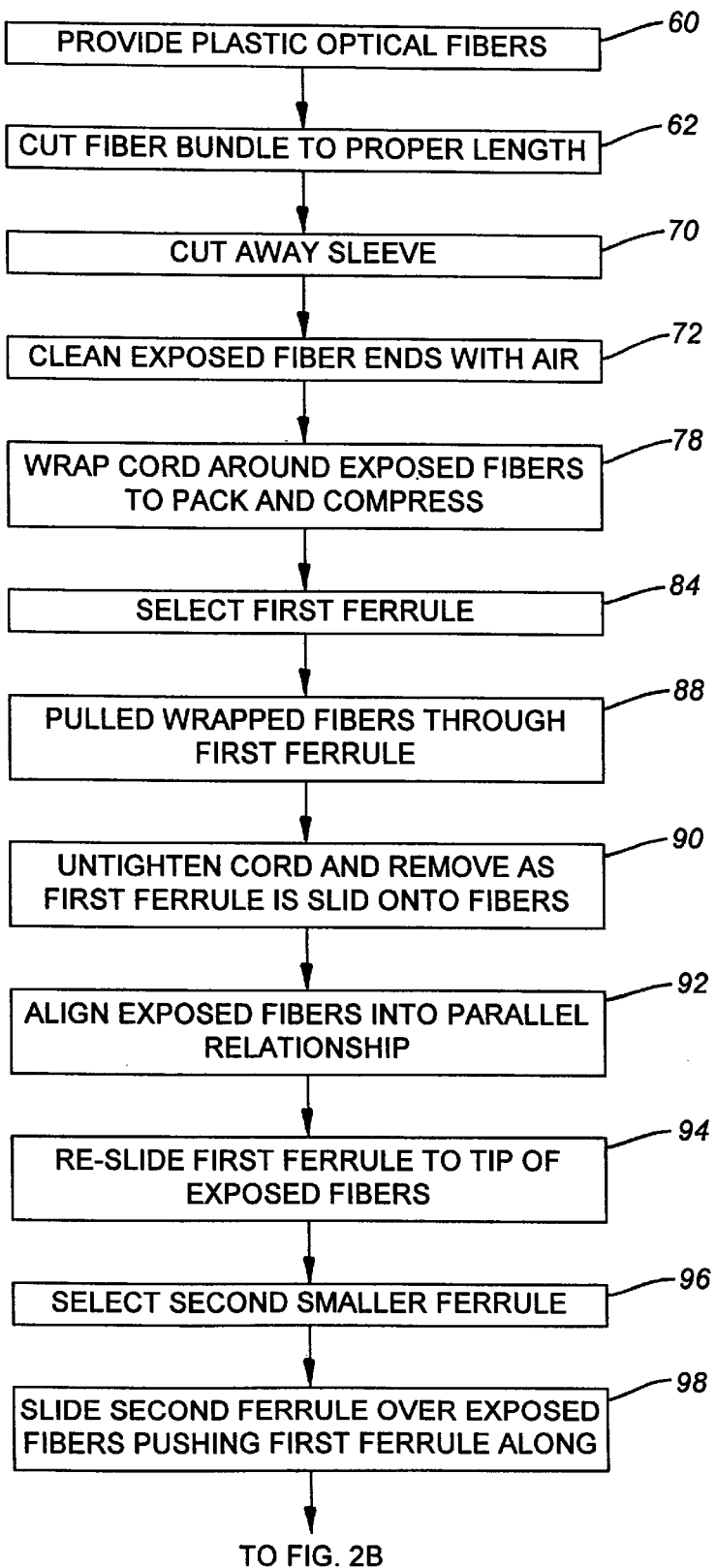
FIG. 2 illustrates a flow chart setting forth one embodiment of the inventive steps to construct a terminal end of a fiber optic cable bundle constructed according to the present invention.
Figure 2B:
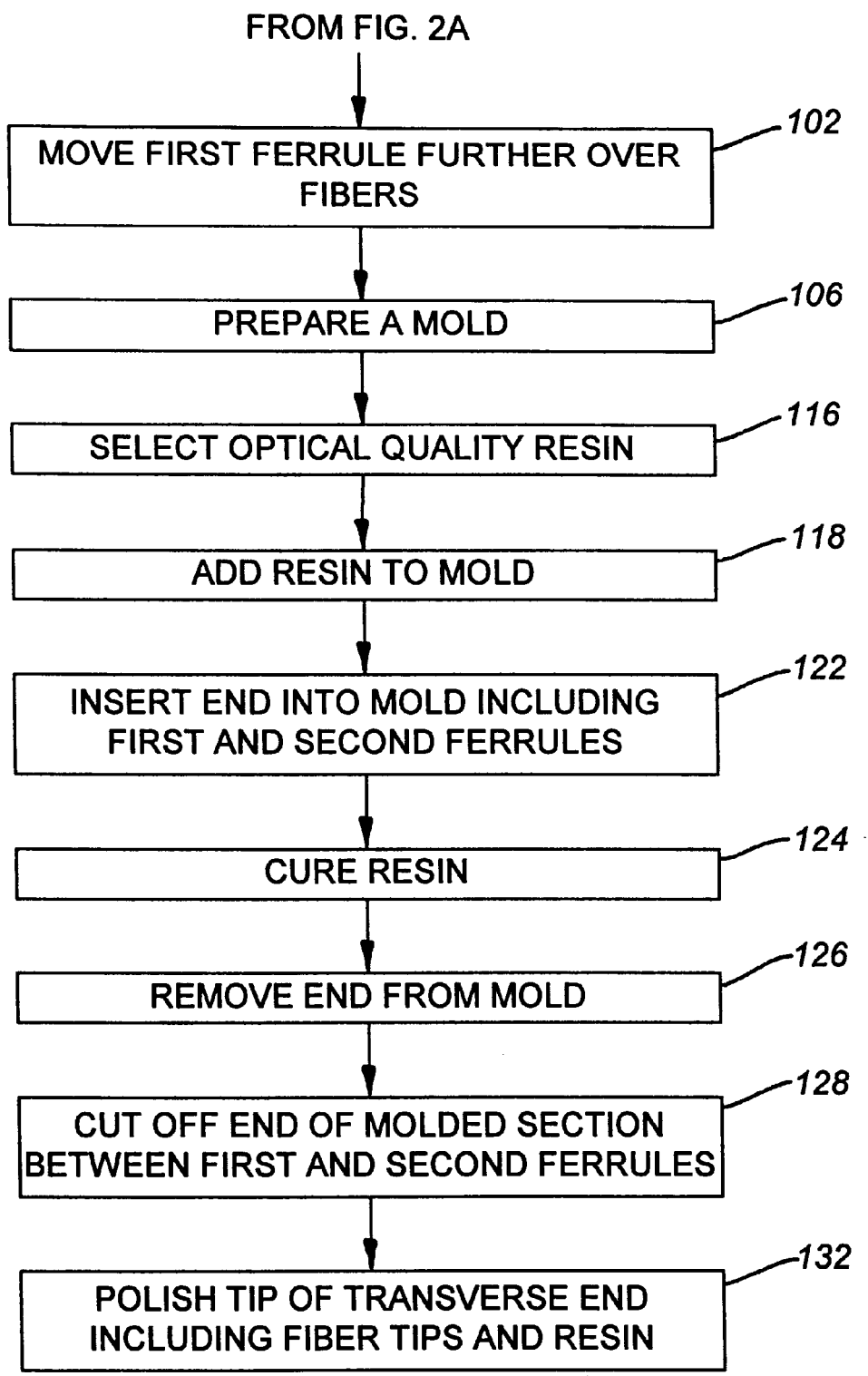

FIG. 2 illustrates a schematic flow chart of the steps for forming a terminal end of a fiber optic cable bundle having improved light transmitting characteristics and increases durability at elevated temperatures. The first step indicated at block 60 is to provide a fiber optic cable bundle wherein the bundle comprises a plurality of generally parallel arranged plastic optical fibers. Plastic optical fibers can be fabricated from a variety of different materials. One such preferred material is known as polymethylmethacrylate or PMMA. Each optical fiber can have a diameter in the range of about 0.1 to 2.0 mm or more and can even be provided having a diameter on the order of about 13 mm or 0.5 inches. In comparison, conventional glass optical fibers are extremely small in diameter, such as in a range of about 30 to 100 microns.

Figure 3:
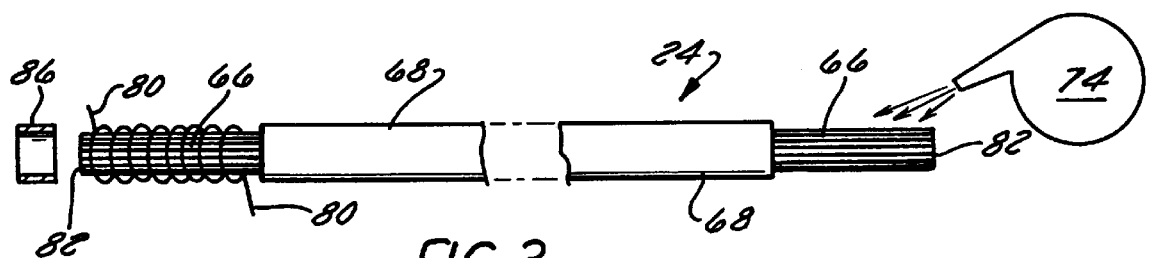
FIGS. 3, 4, 5 and 6 illustrate the terminal ends of a fiber optic cable bundle at various stages of fabrication according to the method and flow chart of FIG. 2.

Once the cable containing the plastic optical fibers is selected, a particular length of cable for a particular use is cut from a continuous length of cable. Such a cable typically includes a jacket or sleeve material surrounding the fibers to protect the optical fibers from the elements and other damage during handling and use. Block 62 shows that the cable is cut to a desired length. FIG. 3 illustrates a perspective view of a fiber optic cable bundle 24 including a plurality of plastic optical fibers 66 surrounded by a protective sleeve 68.

As indicated at block 70 of FIG. 2, a portion of the sleeve material 68 is cut away exposing the plurality of optical fibers 66 extending from each end of the length of cable 24. These cable ends 66 are shown extending from the sleeve 68 in FIG. 3.

As illustrated in block 72, the cable ends 66 extending from the material sleeve 68 can be cleaned to remove dust or dirt collected during handling. Forced air from a blower 74 can be used to remove the contaminates as shown in FIG. 3 for illustrative purposes.

As illustrated at block 78 in FIG. 2, a cord is wound in a helical fashion around the exposed portion of the fibers 66 as shown in FIG. 3. The cord 80 is wrapped in such a manner so as to apply increasing pressure as the cord approaches the free or distal ends 82 of the fibers 66. In this manner, the exposed fibers 66 become more tightly packed together at the distal ends 82. The cord 80 may be of any construction but in one embodiment is preferably a cotton cord so that it does not damage the cladding material of the exposed fibers 66.

Figure 4:
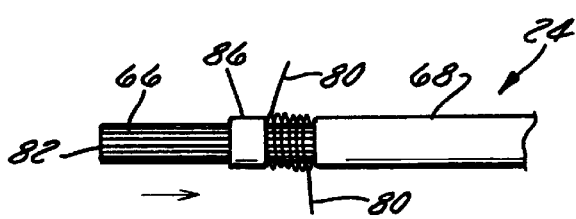

At block 84 illustrated in FIG. 2, a cylindrical first ferrule 86 is selected or provided having a particular inside and outside diameter determined by the size of the fiber optic bundle 24. The first ferrule 86 is preferably made from an optically transparent material such as a polycarbonate material. As indicated at block 88 of FIG. 2 and illustrated in FIGS. 3 and 4, the first ferrule 86 is applied over the wrapped and exposed cable ends 66. The first ferrule 86 is preferably slid onto the exposed cable ends exposing at least 1.5 inches, and preferably 2 to 3 inches, of the cable ends beyond the first ferrule 86 as shown in FIG. 4.

As indicated at block 90 of FIG. 2, the cord 80 is released or unwound from the exposed portion of the fibers 66 extending beyond the first ferrule 86 as it is slid onto the cable bundle. When the first ferrule is completely on the fibers 66, the cord 80 is removed. As indicated at block 92, the exposed fibers are then aligned so that they are essentially parallel to one another. The exposed fibers 66 are aligned or combed to be parallel one another utilizing an alignment tool or aligned by hand. As indicated at block 94 and illustrated in FIG. 5, the first ferrule 86 is then slid back toward and adjacent to the distal ends 82 of the exposed fibers 66.

Figure 5:
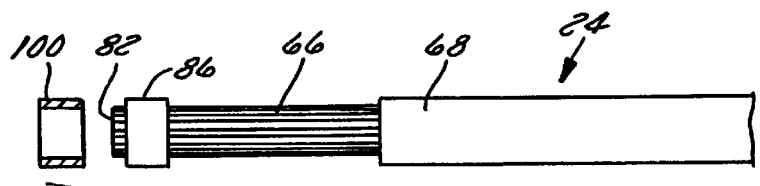
Figure 6:
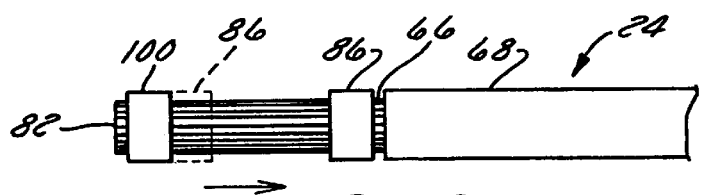

As indicated at blocks 96 and 98 of FIG. 2, a second slightly smaller ferrule 100 is selected having an inside diameter that is 2–3 percent smaller than the inside diameter of the first ferrule 86. The second ferrule is then slid onto the distal ends 82 of the exposed fibers 66 and placed into abutting relation with the first ferrule 86 as shown in FIG. 5. The second ferrule 100 is then slid over the exposed fibers 66 forcing the first ferrule 86 back onto the exposed fibers along with the second ferrule. Once the second ferrule 100 is completely received over the distal ends 82 of the exposed fibers 66, the second ferrule is left in place as illustrated in FIG. 6 adjacent the exposed ends.

According to block 102 of FIG. 2, the first ferrule 86 is then moved back toward the sleeve material defining a separation between the first and second ferrules. This condition is also illustrated in FIG. 6. In this configuration, the first and second ferrules 86 and 100, respectively, hold the fiber optic cables 66 tightly bundled and packed together in an essentially parallel alignment. By using this method, the packing factor can be increased to about 80 to 85 percent, which is a significant improvement over presently known constructions.

Figure 7:
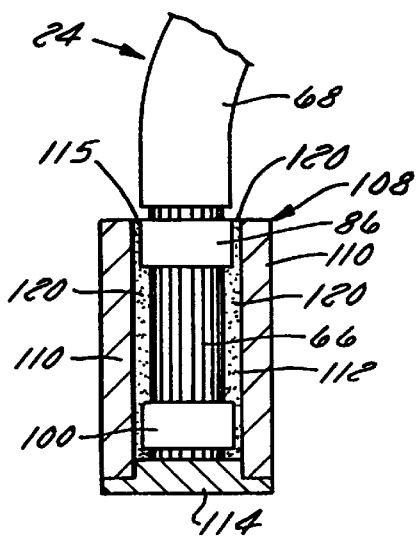
FIG. 7 illustrates the fiber optic cable bundle of FIG. 6 upon insertion of the terminal end into a mold cavity.

As indicated at block 106 of FIG. 2 and illustrated in FIG. 7, a mold 108 is prepared for further forming the terminal end of the fiber optic bundle 24. The mold 108 includes a cylindrical portion or wall 110 defining a cylindrical mold cavity 112 therein. The bottom end of the wall 110 is closed and covered by a mold cover 114. The mold cover 114 seals and engages with the cylindrical wall 110 in any suitable manner, such as for example, by use of mechanical threads so that the cover 114 is screwed into the lower end of the wall as illustrated in FIG. 7. The top end is left open defining an opening 115 in the mold.

As indicated at blocks 116 and 118 of FIG. 2, an optical quality resin material 120 is selected and placed within the mold cavity 112 through the opening 115. The resin 120 is shown in the bottom of the mold cavity in FIG. 7 being retained therein by the cover 114. The ideal resin 120 is selected having the same optical characteristics as the fibers 66.

As indicated at block 122 of FIG. 2, the previously prepared terminal end shown in FIG. 6 of the fiber optic bundle 24 is inserted into the mold cavity 112 through the opening 115. The internal diameter of the cavity 112 is preferably on the order of about 0.01 to about 0.015 inches larger than the outside diameter of the first and second ferrules 86 and 100, respectively. This tolerance range results in a tight fit between the cavity 112 and the outside diameter of the ferrules and yet permits resin to fill the space between the two ferrules 86 and 100 and the wall 110 as well as the gap defined between the two ferrules. The terminal end is shown in phantom view in FIG. 7 as being completely immersed in the resin 120.

The resin 120 is then cured and hardened according to the particular characteristics and requirements of the selected optical quality resin and as indicated at block 124 of FIG. 2. Once the resin is completely cured, the terminal end is removed from the mold as indicated at block 126 of FIG. 2. The terminal end after molding is illustrated in FIG. 8 and includes the resin material 120 molded around both the first and second ferrules 86 and 100, respectively, and the exposed portion of the fibers 66 in the gap between the two ferrules. The terminal end of the cable 24 is then removed from the mold cavity 112 by any conventional means. It may be necessary to prepare the mold 108 and the terminal end prior to insertion into the mold in order to facilitate separation of the resin from the mold cavity once the resin is cured. There are certain types of commercially available release substances to prepare the surfaces of the terminal end and mold. Such substances ease separation of the two components once the resin is cured. Additionally, an applied force may be necessary in order to separate the two components once the resin is cured.

Figure 8A:
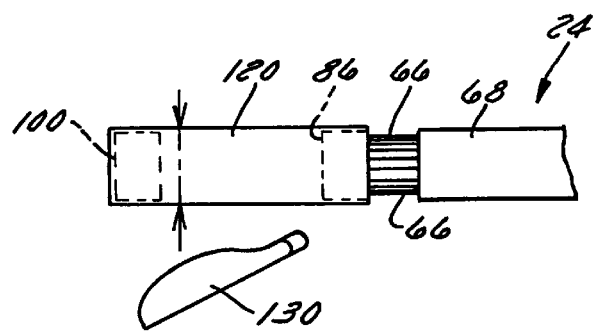
FIGS. 8A and 8B illustrate removal of a portion of the terminal end after undergoing the casting or molding process illustrated in FIG. 7.
Figure 8B:
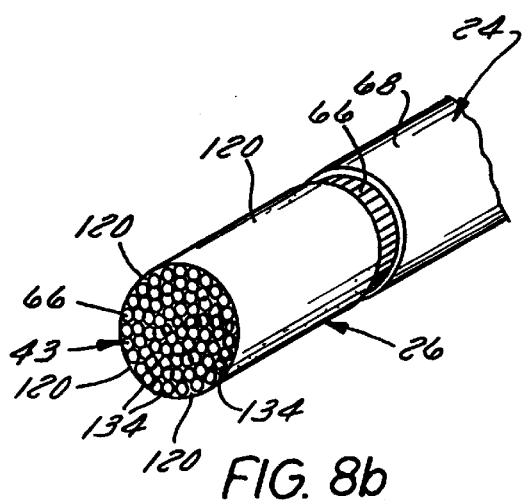

As indicated at block 128, a cutting apparatus 130 illustrated in FIG. 8 is then utilized to cut a portion of the terminal end after molding from the remainder of the bundle. The second ferrule 100 and the resin 120 surrounding the second ferrule are removed exposing the transverse surface 43. This surface exposes only hardened resin 120 and the newly exposed distal ends or tips 134 of the optical fibers 66 as illustrated in FIG. 8a.

Figure 9:
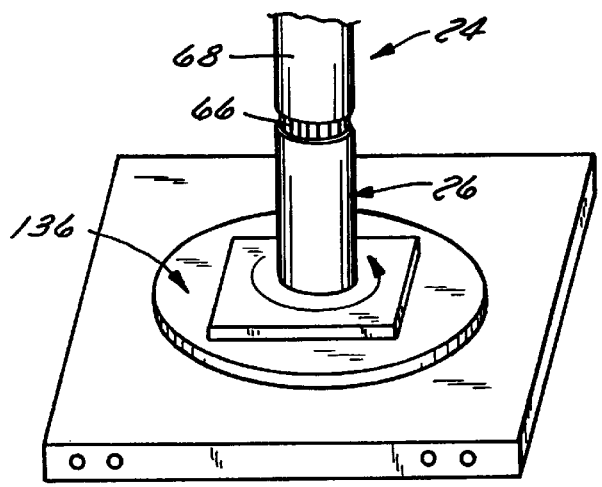
FIG. 9 illustrates the terminal end of the fiber optic cable bundle undergoing a polishing process.

As indicated at block 132 of FIG. 2, the transverse surface 43 of each terminal end 26, 28 of the fiber optic bundle 24 after molding and cutting is polished to a predetermined degree and preferably to a mirror quality finish. As illustrated in FIG. 9, the polishing process may be any suitable process for producing the desired finish on the tip or transverse surface 43 of the cast or molded terminal ends. Known means include utilizing a lapping or grinding machine 136 that grinds and polishes the surface 43 to produce the desired mirror quality finish.

Once the cable 24 is prepared, it is ready for use in the remote lighting system 20 according to the invention. The novel terminal end constructions and novel method for producing the terminal ends greatly improve the known methods and constructions for several reasons. First, the packing factor is increased by 10 to 20 percent or more over prior cable bundle constructions. This fact alone increases the efficiency of the cable 24. Secondly, the use of an optically transparent ferrule and the optical quality resin greatly reduces the amount of absorbed light energy in the terminal end. Most of the incident energy is thus transmitted by the fibers to the output or remote terminal end 28. This even further improves the overall efficiency of the cable bundle.

As illustrated in FIG. 1, the fiber optic bundle 24 constructed in accordance with present invention is connected to the housing 32 of the lighting apparatus 30. The terminal ends 26 and 28 may each include a molded and polished surface 43 also illustrated in FIG. 1. One advantage of utilizing the novel construction described above is that the optically transparent molded resin material 120 does not absorb a lot of the light energy and instead passes the energy to be transmitted with the optical fibers described above. Thus, less light generated heat is absorbed and retained at each of the terminal ends when compared to prior known constructions. This prolongs the life and reduces the possibility of destroying the terminal ends. Additionally, the molded construction also increases the efficiency of the optical fiber bundle 24. Because less light energy is absorbed by the optical resin material 120, the energy is transmitted into the optical fibers to the remote terminal end 28 and distributed to the area to be illuminated. Thus, the efficiency of the lighting system is improved. Therefore, either more light from a standard high intensity lamp 22 may be distributed to the location at the terminal end 28 or the same amount of light may be distributed utilizing a lower power or slightly smaller lamp assembly 22.

Previously known remote lighting systems utilizing such optical fibers are about 50–55 percent efficient meaning 45–50 percent of the light energy is lost and absorbed by the system and not transmitted to the location to be illuminated. By contrast, the present invention produces a cable that is approximately 80–85 percent efficient resulting in a vast improvement over prior known constructions.

Another advantage is that the optical quality resin 120 does not absorb much light energy produced by the high intensity light source 22. Therefore, the resin 120 is less likely to be destroyed and does not separate from the optical fibers 66. Therefore, the resin does not block transmission of light energy into the optical fibers. This further increases the efficiency of the novel system.

Referring now to FIGS. 10–15, a novel cooling means for a terminal end or source end 26 of a fiber optic bundle 24 is disclosed. FIG. 1 illustrates a simple schematic of a light source assembly 30. FIGS. 10–15 illustrate in more detail several alternative embodiments to the construction disclosed in FIG. 1. With that in mind, like parts between FIG. 1 and the constructions of FIGS. 10–15 have been given like reference characters. New or alternative components have been given new reference characters in order to distinguish the differences.

Figure 10:
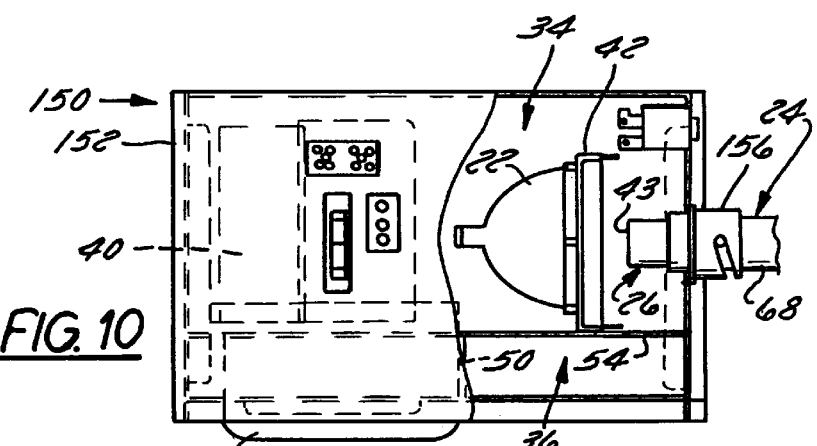
FIG. 10 illustrates a top partially cut-away view of one embodiment of a light source assembly for the lighting system shown in FIG. 1 constructed in accordance with the present invention.
Figures 11, 12:
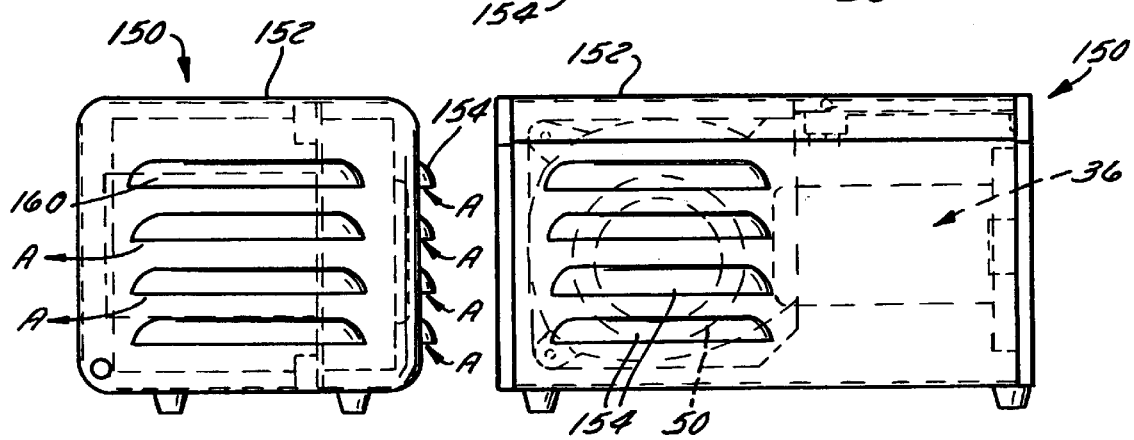
FIG. 11 illustrates a side view of the light source assembly of FIG. 10.
FIG. 12 illustrates an end view of the light source assembly of FIG. 10.

Referring now to FIG. 10, a light source assembly 150 is illustrated which is very similar in construction to the schematic illustrated in FIG. 1. The light source assembly 150 includes a housing 152 which has a louvered air intake 154 adjacent the fan or blower 50. The blower 50 is again disposed within a chamber or plenum 36 and has a small duct or orifice 54 directing air transversely across the terminal end 26 of the fiber optic bundle 24 installed facing the light source assembly 22. The housing 152 includes a fitting 156 for securely holding the bundle 24 into the housing 152. The light source assembly 150 also includes the primary chamber 34 and the power supply 40 and the light source 22 therein. The diffuser or optical element or filter 42 is also disposed over the light source 22. A louvered exhaust outlet 160 replaces the exhaust opening 56 of FIG. 1. The louvers 154 and 160 control the direction of air entering and exiting the housing 152.

The duct or air passage 54 in the present embodiment is designed to have a diameter much smaller than the cross sectional size of the air plenum or chamber 36. The smaller diameter increases the velocity of air produced by the blower 50 as it passes from the chamber 36 through the duct 54 and across the terminal end 26 of the bundle 24. The duct 54 is precisely located and designed to direct the flow of air directly onto and across the terminal end. In this regard, a small stream of air is directed at very high velocity across the terminal end and the transverse surface 43 in order to keep the tip cool during operation of the light source assembly 150.

The duct 54 may be in the form of a small opening or may be in the form of a tapered nozzle or venturi in order to provide precise directional and velocity control of the air flow. The duct or passage 54 is also preferably tailored to produce the stream of air having a predetermined width. The width is intended to be substantially the same as the length of the resin 120 remaining on the terminal end 26. This is so that the entire terminal end 26 is cooled by the high velocity air stream.

Figure 13:
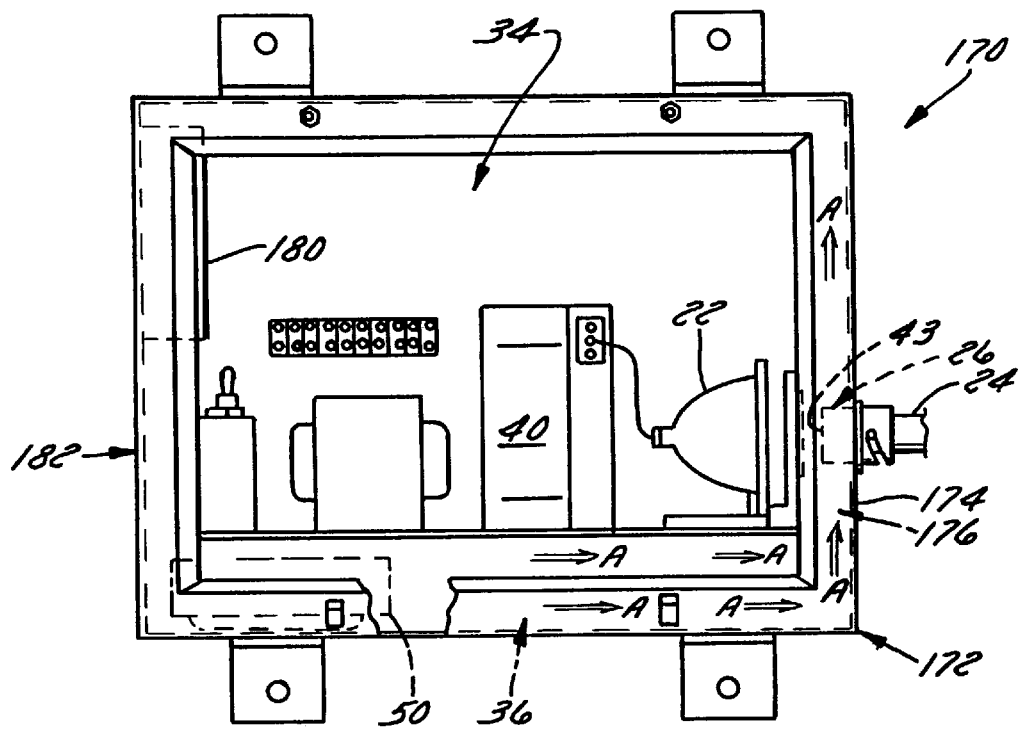
FIG. 13 illustrates a top partially cut-away view of an alternative embodiment of a light source assembly of the lighting system shown in FIG. 1.
Figure 14:
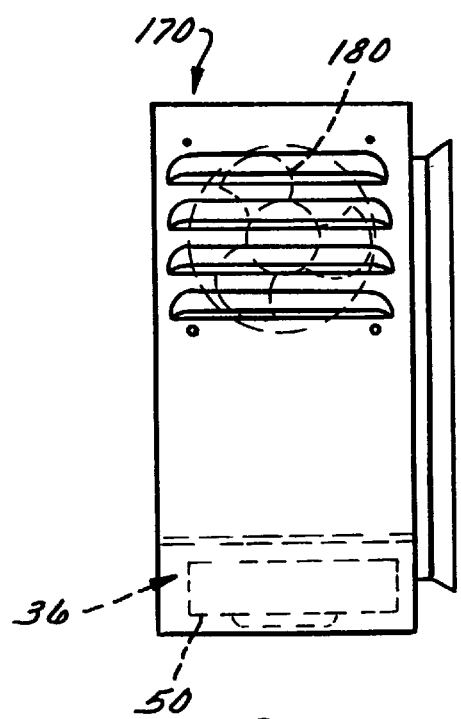
FIG. 14 illustrates an end view of the light source assembly of FIG. 13.

FIGS. 13 and 14 illustrate an alternative embodiment of a light source assembly 170 of a slightly alternative construction. Essentially, the blower 50 is disposed within a plenum or chamber 36 and directs a large volume of air at relatively high velocity from the blower along the plenum 36. The plenum narrows considerably at one end 172 of a housing 174 to define a smaller channel or air plenum 176 at the end 172. Air forced by the blower 50 through the larger plenum 36 is thus forced at higher velocity through the smaller chamber 176. The terminal end 26 of the bundle 24 is exposed within the smaller air plenum 176 and therefore the high velocity stream of air is forced directly and transversely across the surface 43 and the entire terminal end 26 of the bundle in order to cool the terminal end of the cable. Again, the width of the smaller plenum 176 is about the same as the length of the terminal end 26.

This embodiment also illustrates an optional exhaust fan 180 disposed at the other end 182 of the housing 174. The exhaust fan 180 may be utilized to draw warm air out of the chamber 34 similar to the prior art cooling means described above.

Each embodiment of the light source assembly of the invention illustrates providing a precisely directed high velocity flow of air over the transverse surface 43 and entire terminal end 26 of the fiber optic cable bundle 24. This is an improvement over the prior known methods that simply exhaust air from an intake to an exhaust through the primary chamber 34 of the housings. The novel means of the invention produces a much more efficient cooling of the terminal end 26 including the transverse surface 43 of the cable bundle 24.

The entire system of the invention permits use of both a high intensity illuminator and a plastic fiber optic cable bundle in the system. The cooling fan directs a narrow, high velocity stream of air over only the terminal end of the bundle. The air stream width is tailored to match the length of the terminal end. Any heat absorbed by the transverse surface is conducted over the entire length of the resin of the terminal end. The air stream cools the entire resin end. The terminal end construction essentially eliminates all of the heat absorbing components of prior terminal end constructions such as the metal ferrule and epoxy resin. The method of forming the terminal ends of the invention also produces a cable bundle end having a higher packing factor or more tightly packed fibers.

Though the invention has been described referring to particular embodiments, many other changes and modifications may be made to the invention as described without departing from the spirit and scope thereof. The scope and spirit of these changes will become apparent upon review of the appended claims. The scope of the invention is therefore intended only to be limited by the appended claims.

What is claimed is:

1. A lighting apparatus comprising:

a housing enclosure defining therein a primary chamber and a secondary plenum separate from the primary chamber;

a high intensity light source held within the primary chamber and having a light emitting end;

a fiber optic cable bundle attached to the housing and having a plurality of plastic optical fibers held within a sleeve, a source end disposed facing the light emitting end of the light source, and a remote end for placement in an area to be illuminated;

an air moving device held within the secondary plenum for creating a stream of air moving within the secondary plenum at a first velocity; and an air passage communicating with the plenum and shaped for concentrating and directing the stream of air across the source end of the cable bundle at an increased velocity.

2. The lighting apparatus according to claim 1, further comprising an optical element disposed between the light emitting end of the light source and the source end of the fiber optic cable bundle.

3. The lighting apparatus according to claim 1, wherein the air passage is disposed in a wall separating the primary chamber and the secondary plenum and has a cross sectional area substantially smaller than the secondary plenum and is positioned so that the stream of air is directed transversely relative to the cable bundle, the stream of air having a width approximately the same as a length of the source end of the cable bundle.

4. The lighting apparatus according to claim 1, wherein the air passage is a tertiary plenum downstream of the secondary plenum and into which the source end of the cable bundle extends transversely relative to the stream of air, the tertiary plenum having a smaller cross sectional area than the secondary plenum and has a width approximately the same as a length of the source end of the cable bundle.

5. The lighting apparatus according to claim 1, further comprising:

an ambient air intake communicating with the air moving device; and an exhaust outlet in the housing permitting air to exit the primary chamber.

6. A fiber optic cable bundle terminating at a pair of terminal ends, the cable bundle comprising:

a plurality of elongate plastic optical fibers bound together within a sleeve, each optical fiber having a fiber tip at each respective terminal end;

an exposed end of each of the plurality of optical fibers extending beyond the sleeve adjacent at least one of the terminal ends;

a cylindrical ferrule having opposed open ends made from an optically transparent material surrounding a portion of the exposed ends of the optical fibers; and an optical quality resin material molded and cured to encapsulate the ferrule and a substantial portion of the exposed ends of the optical fibers, wherein the resin material is flush with the fiber tips of the optical fibers at the at least one terminal end.

7. The fiber optic cable bundle according to claim 6, further comprising:

each terminal end having the optical fibers exposed, an optically transparent ferrule surrounding the exposed ends, and an optical quality resin material molded and cured to encapsulate each ferrule and exposed optical fiber at each terminal end.

8. The fiber optic cable bundle according to claim 6, wherein the optical fibers are made from a plastic material such as PMMA.

9. The fiber optic cable bundle according to claim 6, wherein each optical fiber has a diameter of at least 0.1 mm.

10. The fiber optic cable bundle according to claim 6, further comprising a packing factor of at least 80 percent optical fiber material and at most 20 percent resin material exposed at a transverse surface of the exposed ends.

11. The fiber optic cable bundle according to claim 6, wherein the fiber tips at the at least one terminal end are polished.

12. A method of forming a terminal end of an optical fiber cable bundle, the method comprising the steps of:

providing a fiber optic cable bundle including a sleeve surrounding a plurality of plastic optical fibers, each optical fiber having a fiber tip at each respective end;

removing a portion of the sleeve exposing one end of each of the optical fibers beyond a corresponding end of the sleeve;

sliding a first ferrule having a first diameter over the exposed ends of the optical fibers, the first ferrule being made from an optically transparent material;

sliding a second ferrule having a second diameter smaller than the first diameter into abutting relation with the first ferrule and over the exposed ends of the optical fibers;

moving the first ferrule further onto the exposed ends of the optical fibers to define a gap between the first and second ferrules;

molding an optical quality resin material so as to fill the gap and surround the exposed ends of the optical fibers including the first and second ferrules;

curing the resin material;

separating the second ferrule from the cable bundle including the resin material surrounding the second ferrule exposing a transverse surface; and polishing the transverse surface including the fiber tips and the resin material to a desired finish.

13. The method according to claim 12, further comprising the step of:

cleaning the exposed optical fibers after the step of removing.

14. The method according to claim 12, further comprising the step of:

winding a cord around the exposed ends of the optical fibers to tightly pack the optical fibers at the exposed ends to a decreasing tapered diameter approaching the fiber tips prior to the step of sliding the first ferrule.

15. The method according to claim 12, further comprising the step of:

preparing a mold having a mold cavity therein; and filling the mold cavity with the optical quality resin prior to the step of molding.

16. The method according to claim 15, wherein the step of molding further comprises the step of:

immersing the terminal end of the cable bundle in the resin within the mold cavity prior to the step of curing.

17. A method of forming a terminal end of an optical fiber cable bundle, the method comprising the steps of:

providing a fiber optic cable bundle, each optical fiber having a fiber tip at each respective end;

positioning first and second ferrules onto the exposed ends of the optical fibers so as to define a gap between the first and second ferrules, the first ferrule having a first diameter and being made from an optically transparent material, and a second ferrule having a second diameter smaller than the first diameter;

molding an optical quality resin material so as to fill the gap and surround the exposed ends of the optical fibers including the first and second ferrules;

curing the resin material; and separating the second ferrule from the cable bundle including the resin material surrounding the second ferrule exposing a transverse surface.

* * * * *